(12) United States Patent
Langford

(10) Patent No.: US 7,065,520 B2
(45) Date of Patent: Jun. 20, 2006

(54) METHOD OF LOCATING WEB-PAGES BY UTILISING VISUAL IMAGES

(76) Inventor: Ronald Neville Langford, 15 Browning Boulevarde, Battery Hill, Queensland 4551 (AU)

( * ) Notice: Subject to any disclaimer, the term of this patent is extended or adjusted under 35 U.S.C. 154(b) by 345 days.

(21) Appl. No.: 10/381,634

(22) PCT Filed: Oct. 3, 2001

(86) PCT No.: PCT/AU01/01185

§ 371 (c)(1),
(2), (4) Date: Jun. 9, 2003

(87) PCT Pub. No.: WO02/29623

PCT Pub. Date: Apr. 11, 2002

(65) Prior Publication Data

US 2004/0049728 A1    Mar. 11, 2004

(30) Foreign Application Priority Data

| Oct. 3, 2000 | (AU) | ................................. PR0504 |
| Oct. 31, 2000 | (AU) | ................................. PR1150 |
| Feb. 19, 2001 | (AU) | ................................. PR3204 |
| May 28, 2001 | (AU) | ................................. PR5300 |
| Aug. 7, 2001 | (AU) | ................................. PR6855 |

(51) Int. Cl.
*G06F 17/30*    (2006.01)

(52) U.S. Cl. .............................. 707/3; 707/4
(58) Field of Classification Search .................. 707/1, 707/3, 4, 9, 10; 705/10, 11, 26; 709/206, 709/218; 715/501.1; 719/313
See application file for complete search history.

(56) References Cited

U.S. PATENT DOCUMENTS 5,742,816 A    4/1998    Barr et al. .................... 707/3

(Continued)

FOREIGN PATENT DOCUMENTS

JP    10-207898    8/1998

(Continued)

OTHER PUBLICATIONS

Allison Woodruff et al., Using Thumbnails to Search the Web, Mar. 31-Apr. 4, 2001, vol. 3, pp. 198-205.*

(Continued)

*Primary Examiner*—Apu M. Mofiz
(74) *Attorney, Agent, or Firm*—Tucker Ellis & West

(57) ABSTRACT

The present invention provides a web-page (or web-site) search results list which includes images from the actual web-pages or web-sites identified in a user's search, or images associated with the actual organization operating a web-site. This assists a user to locate web-pages of interest or relevance to the user by providing images to assess the relevance of web-pages identified in a search, prior to the user having to hyperlink to the actual web-page itself. The invention also provides a method of assisting a user to be placed in contact with an organization, including the steps of: the user submitting a search request from a terminal, via a computer network, to a database server, the database server containing a database and a server-side application used as database searching software; the database searching software searching the database in accordance with the search request; identified database entries being transmitted to the terminal as a search results list, each entry of the search results list containing contact information for the organization; at least one entry of the search results list additionally containing visual content and/or audio content which relates to the organization.

30 Claims, 4 Drawing Sheets

U.S. PATENT DOCUMENTS

| | | | | |
|---|---|---|---|---|
| 5,873,076 | A | 2/1999 | Barr et al. | 707/3 |
| 5,982,369 | A | 11/1999 | Sciammarella et al. | 715/835 |
| 6,070,176 | A | 5/2000 | Downs et al. | 715/513 |
| 6,271,840 | B1 | 8/2001 | Finseth et al. | 715/513 |
| 6,356,908 | B1 | 3/2002 | Brown et al. | 707/10 |
| 6,643,641 | B1 | 11/2003 | Snyder | 707/4 |
| 6,665,838 | B1 | 12/2003 | Brown et al. | 715/501.1 |
| 6,785,891 | B1 * | 8/2004 | Allen et al. | 719/313 |

FOREIGN PATENT DOCUMENTS

| | | |
|---|---|---|
| RU | 2 138 076 C1 | 9/1999 |
| WO | WO-98/36366 | 8/1998 |
| WO | WO-01/63484 A2 | 8/2001 |
| WO | WO-01/90917 A2 | 11/2001 |

OTHER PUBLICATIONS

Aaron Wiss, Introduction to Dynamic HTML, Aug. 24, 1998, pp. 1-3.*

Wen-Syan Li, et al., "WebDB: A Web Query System and its Modeling, Language, and Implementation", C&C Research Laboratories.

Sougata Mukherjea, et al., "Visualizing the Results of Multimedia Web Search Engines", C&C Research Labs, pp. 64-65.

Sougata Mukherjea, et al., "Visualizing World-Wide Web Search Engine Results", C&C Rearch Laboratories.

Michael Wynblatt, et al., "Web Page Caricaters: Multimedia Summaries for WWW Documents".

* cited by examiner

Figure 1 (Prior Art)

Web Page Matches (1 - 20 of about 266000)   — 2

- Department Of Motor Vehicles
  ...business with the Department of Motor Vehicles (DMV). Please...
  http://www.dmv.ca.gov/

- Massachusetts Registry of Motor Vehicles - www.massmv.com
  ...Massachusetts Registry of Motor Vehicles (c) 1996 - 2000. All...
  http://www.magnet.state.ma.us/rmv/

- Virginia Department of Motor Vehicles
  ...© Virginia Department of Motor Vehicles (DMV) 1999. All...
  ...Licensing Vehicle Services more... Motor Carrier Services Dealer Services...

- Motor Vehicles
  ... Motor Vehicles Motor Vehicle Division Online Vehicle...
  ...Services, Customer Service Guide Motor Carrier Partnerships Authorized...
  http://www.dot.state.az.us/MVD/mvd.htm

- New York State Department of Motor Vehicles Internet Office
  ...New York State Department of Motor Vehicles Permission required to...
  ...Statistics Sampling of recent NYS motor vehicle data. On-line Services at...
  http://www.nydmv.state.ny.us/

- Connecticut Department of Motor Vehicles Home Page
  ...© 2000 The Department of Motor Vehicles. Privacy StatementAll...
  http://dmvct.org/

- Florida Department of Highway Safety and Motor Vehicles
  ...Department of Highway Safety and Motor Vehicles News Releases...
  ...& registration Trucking/Commercial Motor Carriers Mobile Home &...
  http://www.hsmv.state.fl.us/

- Maine Bureau of Motor Vehicles
  ...207-624-9105 Welcome to the Bureau of Motor Vehicles. The Maine...
  ...the public as it relates to Maine motor vehicle laws. The Bureau is head...
  http://www.state.me.us/sos/bmv/

1

METHOD OF LOCATING WEB-PAGES BY UTILISING VISUAL IMAGES

TECHNICAL FIELD

The present invention relates to an improved method of locating web-pages (or web-sites) by utilising visual images, and in particular, to an improved method of locating a web-page of interest to a user prior to the user actually having to connect to the web-page.

The present invention further relates to an improved method of placing a user in contact with an organisation, more specifically by providing an improved directory having image components which are displayed to a user.

Furthermore, the present invention relates to a new computer readable medium of instructions for providing a user a with an improved method of locating web-pages by utilising visual images, or placing a user in contact with an organisation.

The present invention furthermore relates to the provision of audio to a user in connection with assisting the user locate web-pages or contact an organisation.

BACKGROUND ART

A search engine is a program that returns a list of web-pages (URLs) that match some user-selected criteria. Generally, a user connects to a search engine web-page and either progressively narrows the scope of the search by selecting terms with mouse-clicks, and/or enters a search term to be matched against a database. Both of these methods are hereinafter referred to as a search request. Once a URL of interest is located the user can mouse-click on the associated hyperlink and be transferred to the actual web-page, which is typically part of a web-site.

Search engine web-sites currently include: ALTA VISTA http://www.altavista.com; EXCITE http://www.excite.com; and YAHOO http://www.yahoo.com, amongst others. These and other search engine web-sites typically act as portal sites. In the Internet, a portal is a web-site on the Internet, which the owner positions as an entrance to other web-sites on the Internet, generally through advertising or endorsement.

Presently, when a user utilises an Internet search engine the user clicks on a 'search' icon and is then presented with a list of categories, for example business, computers, entertainment etc. By progressively moving through these categories the user eventually receives a list indicating a hyperlink to the URL of the most popular web-sites. Alternatively, a user can enter keyword(s) into a designated text entry window. A search engine server computer then searches a database seeking to match the user entered keyword(s) with possibly relevant web-pages or web-sites. Links to the possibly relevant web-pages are presented to the user as a list of hyperlinks retrieved from the database. In either of these search methods when the user mouse-clicks on one of the presented hyperlinks the user is transferred to a web-site which the user hopes is the web-page for which he or she was searching.

Hence, the user is somewhat blindly connecting to the web-page not knowing exactly what to expect. If the web-page is actually of no use or is irrelevant, which in practice occurs frequently, the user must return to the presented list of hyperlinks and repeat this process, which often amounts to guess work by the user in selecting a hyperlink.

Furthermore, in the presented list of hyperlinks a particular web-page or web-site may be repeated several times. For example, several web-pages of a single web-site may be presented as separate hyperlinks in the presented list of search results. This is often undesirable when a user simply wishes to be presented with a list of alternate web-sites.

Most databases, indexes and directories are text driven, as mentioned above, thereby forcing organisations keen to present a profile or product image on the Internet to make use of click through or banner advertising in order to effectively reach Internet users. Given the enormous value of e-business which the computer-related and Internet areas expect to generate, this provides a need to minimise the time which a user spends accessing information (for the user's benefit), for example accessing an organisation's web-site, whilst still effectively presenting a profile or product image to the user.

When a user is presented with a list of hyperlinks the user is often uncertain as to the organisation which owns the web-page or web-site to which the hyperlink points. There is a need to provide search results in a format whereby a user can relatively easily identify distinct companies or organisations, product images, brand names and/or trade marks and the like, without having to perform additional steps and connect to additional web-pages (the organisation web-pages) from the search engine web-site, until the actual web-page of interest is located.

There is a need to allow organisations or the like to provide search engine users with images, web-site images, brand name images, product images, trade marks and/or logos and the like, directing in response to the users search request so that marketing and user identification of an organisation is more effective.

Furthermore, there is a need to provide a user with a more convenient means to be placed in contact with an organisation of relevance to their search inquiry, for example via telephone or the organisation's web-site, once the user has submitted a search request.

Additionally, online directories, such as online business directories, require a user to select the type of business and the location. After further mouse-clicks the user is typically presented with inadequate or unusable information. This often proves unsatisfactory and generally only relates to business's which have become subscribers of the online business directory in a particular geographical region. There is a need to provide a user with a full online directory which lists all available businesses, not just subscriber businesses, and which offers the user visual content for at least some of the directory entries.

In a networked data communications system, users have access to terminals which are capable of requesting and receiving information from local or remote information sources. In such a system a terminal may be any type of computer or computerised device, a personal computer (PC), a mobile or cellular phone, a mobile data terminal, a portable computer, a personal digital assistant (PDA), a pager, or any other similar type of electronic device. The capability of the terminal to request and/or receive information can be provided by an application program, hardware or other such entity. A terminal may be provided with associated devices, for example an information storage device such as a hard disk drive.

In such a system an information source may be a server or any other type of terminal (for example, a PC computer) coupled to an information storage device (for example, a hard disk drive). The exchange of information (i.e., the request and/or receipt of information) between the terminal and the information source, or other terminal(s), is facilitated by a connection referred to as a communication channel. The communication channel can be physically realised via a metallic cable (for example, a telephone line), semi-conducting cable, an electromagnetic signal (for example, a radio frequency (RF) signal), an optical fibre cable, a microwave link, a satellite link or any other such medium or combination thereof connected to a network infrastructure.

The infrastructure may be a telephone switch, a base station, a bridge, a router, or any other such specialised component, which facilitates the connection between the terminal and the network. Collectively, the interconnected group of terminals, physical connections, infrastructure and information sources is referred to as a computer network or data communications network.

The computer network itself may take a variety of forms. It may be located within a local geographic area, such as an office building, and consist of only a limited number of terminals and information sources. This type of computer network is commonly referred to as a Local Area Network (LAN). On a broader scale, it may be larger and support more users over a wider geographic area, such as across a city. This type of network is commonly referred to as a Wide Area Network (WAN). On an even broader scale LAN and WAN networks may be interconnected across a country or globally. An example of a globally connected computer network is the Internet.

To a user the Internet appears to be a single unified computer network, although in reality it consists of many different types of computer platforms utilising many diverse data communications technologies. The technologies are connected together in such a manner so they appear transparent to the user. This transparency is made possible through the use of a standard communications protocol suite known as Transmission Control Protocol/Internet Protocol (TCP/IP).

The Hyper-text Mark-up Language (HTML) and Hypertext Transfer Protocol (HTTP) have developed to make the Internet or World Wide Web very accessible. The exchange of information on the Internet is further facilitated through hyper-text documents. Hyper-text documents are unique in that they use tags to define links which, when selected, fetch the related information from within the same document or from a new document altogether. The links are defined using HTML which provides a document formatting method which adapts in a consistent manner to any computer on which it is displayed. HTML tags are used to define the various components of an ASCII text file, image or sound which make up a hyper-text document, including such things as formatting and linking to other documents. HTML tags which link documents on one Internet information source to those on another (hyperlinks) do so by associating a Uniform Resource Locator (URL) with the referenced information. The ability to link Internet files of similar and/or differing formats to each other, and to link documents on other Internet sites, is a powerful feature of the Internet.

This identifies a need for an improved method of locating web-pages by utilising visual images, or placing a user in contact with an organisation, which overcomes the problems inherent in the prior art. This also identifies a need for a new computer readable medium of instructions for providing a user a with an improved method of locating web-pages by utilising visual images, or placing a user in contact with an organisation, which overcomes the problems inherent in the prior art.

DISCLOSURE OF INVENTION

According to one aspect, the present invention provides a web-page or web-site search engine, whereby the search engine provides a search results list containing at least one entry, or no entries if no search results are found, and if at least one entry is provided, then, at least one entry contains visual content in addition to a hyperlink to a web-page. The search results list is formed from a database in response to a user's search request; that is, in response to the user's search request identified database entries are formed into the search results list.

It should be noted that in one embodiment the present invention is described with reference to locating web-pages, however, the present invention can equally be considered to be applicable to locating web-sites, a web-site being a collection of one or more web-pages.

According to one particular embodiment of the present invention, each entry of the search results list is provided to a user in a format which includes a hyperlink, a 'mini-image' of the homepage of the web-site to which the hyperlink points, and a link for additional contact information. Alternatively, the mini-image can be of any selected web-page from a web-site.

In a specific embodiment of the present invention, there is provided a method for locating a web-page, the method including the steps of: a user submitting a search request to a server-side application via a terminal; the server-side application searching a database in accordance with the submitted search request; and identified database entries being transmitted to the terminal as a search results list, each entry containing a hyperlink to a web-page; whereby, each entry of the search results list contains visual content, the visual content related to the web-page for which the entry contains a hyperlink, the user able to view the visual content without being required to activate the hyperlink to obtain the visual content. The visual content can be comprised of more than one image. The visual content can also be provided in addition to other textual information.

In a further specific embodiment of the present invention, there is provided a method of assisting a user to be placed in contact with an organisation, including the steps of: the user submitting a search request from a terminal, via a computer network, to a database server, the database server containing a database and a server-side application used as database searching software; the database searching software searching the database in accordance with the search request; identified database entries being transmitted to the terminal as a search results list, each entry of the search results list containing contact information for the organisation; each entry of the search results list additionally containing visual content and/or audio content which relates to the organisation. According to another aspect, the server-side application facilitates keyword searching of the database of organisation's web-pages. The terminal can be a PC and the search results list can be presented to the user via an Internet browser application.

In a further specific embodiment of the present invention, there is provided a method of assisting a user to be placed in contact with an organisation, including the steps of: the user submitting a search request from a terminal, via a computer network, to a database server, the database server containing a database and a server-side application used as database searching software; the database searching software searching the database in accordance with the search request; identified database entries being transmitted to the terminal as a search results list, each entry of the search results list containing an organisation's contact information; whereby, at least one entry of the search results list contains visual content relating to the organisation identified in the entry. The contact information may be telephone, e-mail or facsimile contact information provided as a hyperlink which the user can mouse-click to initiate each mode of contact with the organisation via the user's terminal. The search results list contains both entries which are provided with visual content and entries which are not provided with visual content. Also, only organisation's which have subscribed to the database service are provided with a database entry having visual content. Broadly, this method provides an online business directory. Specifically, it can be provided that when the user moves a mouse pointer over an entry in the search results list, then the visual content appears to the user, but only if there is visual content associated with the particular entry.

In a further specific embodiment of the present invention, there is provided a method of assisting a user to be placed in contact with an organisation which has subscribed to a directory service, including the steps of: the user submitting a search request from a terminal, via a computer network, to a database server, the database server containing a database and a server-side application used as database searching software; the database searching software searching the database in accordance with the search request; identified database entries being transmitted to the terminal as a search results list, each entry of the search results list containing contact information for the organisation; each entry of the search results list additionally containing visual content and/or audio content which relates to the organisation.

In a further specific embodiment of the present invention, there is provided a computer-readable medium of instructions for directing a computer to obtain a search results list of web-pages, the computer-readable medium of instructions performing the steps of: receiving a search request from a user; transmitting the search request to a server-side application, the server-side application residing on a database server, the server-side application able to search a database of web-pages on the database server; receiving identified database entries from the server-side application and presenting the identified database entries to the user as a search results list; whereby, the search results list presented to the user includes entries each having visual content indicative of the web-page for which each entry relates. The visual content can be an image, video, animation, mini-image of a web-page, logo or trade mark. If audio information forms part of an entry of the search results list, the audio information can be played to a user automatically or in response to a user action. The user action can be locating a computer mouse in a defined area, or clicking a computer mouse on a defined object on a terminal screen or in a defined area.

In a further specific embodiment of the present invention, there is provided a web-page search engine, the search engine providing a search results list to a user in response to a search request from the user, the search results list containing at least one entry, the at least one entry containing visual content related to the identified web-page, in addition to a hyperlink to the web-page. Each entry of the search results list can be provided to the user in a format which includes a hyperlink to the identified web-page, and a mini-image of the homepage of the web-site to which the hyperlink points. The web-page search engine can be itself a web-page and acts as an Internet portal and contains, marketing, advertisements, or endorsements.

In a further specific embodiment of the present invention, there is provided a computer-readable medium of instructions for directing a computer to obtain a search results list of organisations and contact information, the computer-readable medium of instructions performing the steps of: receiving a search request from a user; transmitting the search request to a server-side application, the server-side application residing on a database server, the server-side application able to search a database of organisations on the database server; receiving identified database entries from the server-side application and presenting the identified database entries to the user as a search results list; whereby, the search results list presented to the user includes entries each having visual content indicative of the organisation for which each entry relates.

In an embodiment of the present invention, the visual content is a hyperlink. Broadly, the visual content is an image, video, animation, and/or a mini-image of a web-page. In another form of the invention it is sought to provide that the visual content may be a logo or trade mark of an organisation which is unrelated or related to the web-site to which the entry relates. In another form of the invention, the mini-image is a reduced scale image of the organisation's homepage. In yet another form of the invention the mini-image is a thumbnail image of the organisation's homepage. In another form of the invention, the mini-image is additionally provided or associated with the organisation's logos, information, other text, trade marks, etc. In still another form of the invention the mini-image is provided in addition to other information obtained from a text driven database.

In a preferred embodiment, the present invention provides a keyword searchable directory of organisation's having web-pages or web-sites. Also, the present invention seeks to provide that keywords which may be searched relate to an organisation's name, or part thereof, trade names, trade marks, etc.

In a specific embodiment of the present invention, a central database contains all visual content, mini-images and other information provided to a user in an entry of a search results list, that is, the mini-images and other information are not distributed over numerous terminals.

In a further specific embodiment, the present invention provides that an organisation's telephone, e-mail or facsimile contact information is provided as a component of an entry. In still a further specific embodiment of the present invention, the organisation's telephone, e-mail or facsimile contact information is provided as a hyperlink which a user may click to initiate each mode of contact with the organisation via the user's terminal.

Preferably, when a user has located an entry of relevance the user is only required to single-click his or her mouse to initiate contact with the organisation or be transferred to the organisation's web-site.

In a further embodiment of the present invention, the mini-image is a 'conveyor belt slide show'. Specifically, the 'conveyor belt slide show' can be implemented using Javascript conveyor belt slide show script. In a further embodiment of the present invention, a mini-image, or a slide of a 'conveyor belt slide show', is provided with voice over options. In still a further embodiment of the present invention, the slides of the 'conveyor belt slide show' present advertising, organisation logos, trade marks, etc.

In a further embodiment of the present invention, a mini-image or other part of an identified search entry provides streaming video. It should also be noted that more than one mini-image can be provided per search entry.

In a further embodiment of the present invention, the 'conveyor belt slide show', voice overs, other audio, animation, streaming video or the like, is provided as an option which may be activated or stopped by the user. According to a further embodiment of the present invention, a entry may contain an applet which may launch automatically or only after activation by a user. Such activation may be the user mouse-clicking on part of the entry. In a further embodiment of the present invention, neon imaging functionality can be provided by utilising Javascript.

According to a further aspect of the present invention, each entry of the search results list, visual content, or mini-image is presented in a window or panel on a screen as an organised grouping or hierarchy of pictures or images. The pictures or images can be grouped by user-defined categories, and/or, grouped dynamically as a user obtains search results or visits web-sites. Dynamic grouping may be time based, such as daily, weekly, etc. groupings.

In still a further broad form of the present invention, the invention can include audio provided to the user. In a particular embodiment of the invention, the invention can incorporate Text-To-Speech (TTS) technology.

In yet a further broad form, the present invention provides that the computer network can be any network of two or more communicating computers or terminals including but not limited to, an internetwork, an intranetwork, a LAN, a WAN, or the Internet.

In other embodiments of the present invention there is provided a method for locating a web-page, and a computer-readable medium of instructions for locating a web-page, substantially according to the embodiment described in the specification with reference to the accompanying figures.

Accordingly, the present invention seeks to provide these and other features providing: an improved method of locating web-pages by utilising visual images; an improved method of placing a user in contact with an organisation; and/or a computer readable medium of instructions for providing a user a with an improved method of locating web-pages by utilising visual images, or placing a user in contact with an organisation.

BRIEF DESCRIPTION OF FIGURES

The present invention will become apparent from the following description, which is given by way of example only, of a preferred but non-limiting embodiment thereof, described in connection with the accompanying figures, wherein:

FIG. 1 illustrates a search results list obtained from the prior art.

MODES FOR CARRYING OUT THE INVENTION

Figure 2:
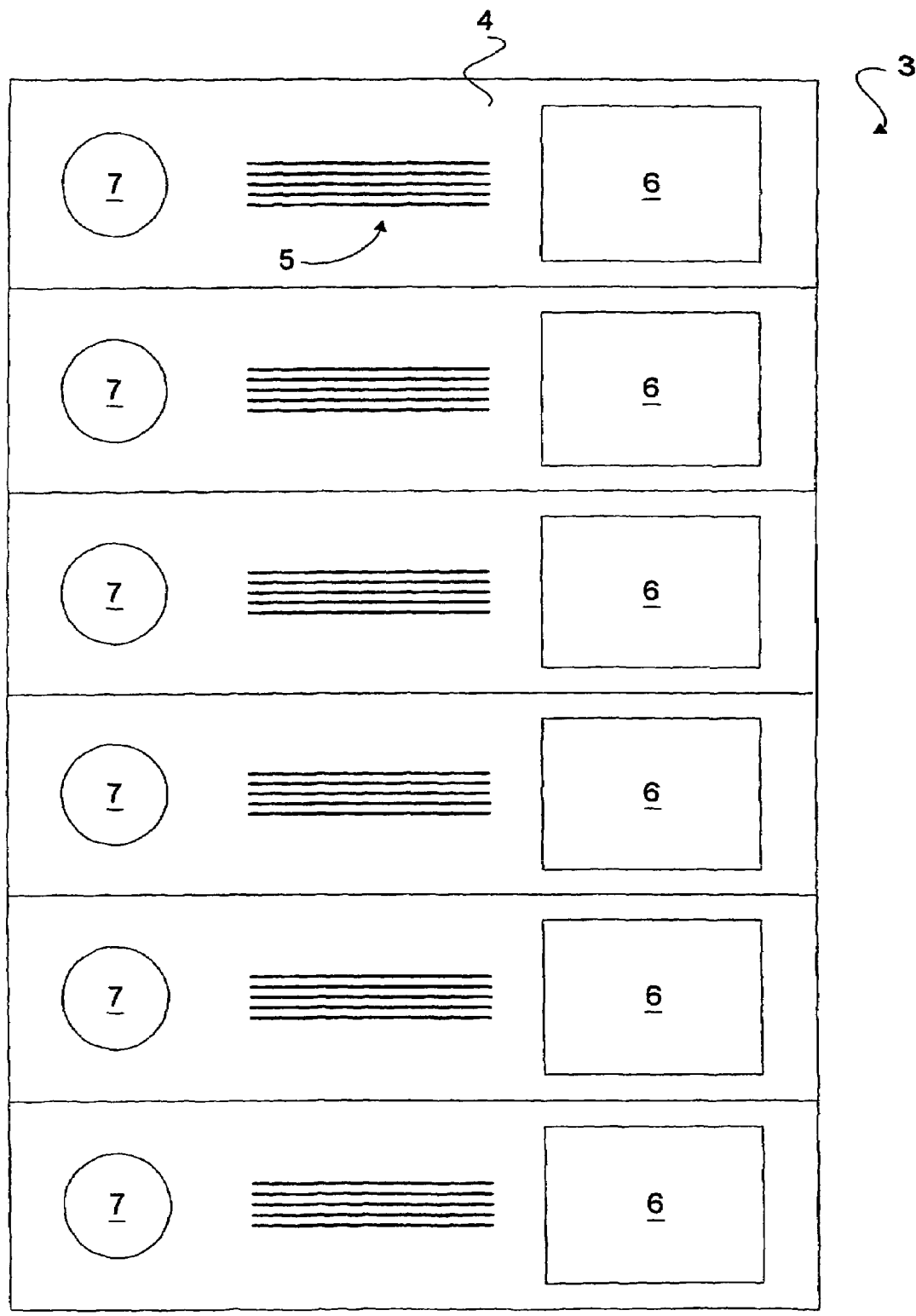
FIG. 2 illustrates an embodiment of the present invention wherein, the figure shows a preferred format of the search results list.

The present invention according to one embodiment provides an improved method of locating web-pages by utilising visual content (such as images or mini-images). This may be termed a search engine. The present invention seeks to provide a web-page (or web-site) search results list which includes images from the actual web-pages or web-sites identified in a user's search, or images associated with the actual organisation operating a web-site. The present invention assists a user to locate web-pages of interest or relevance to the user by providing images to assess the relevance of web-pages identified in a search.

The present invention improves the method of searching for products, services, organisations, information and the like on the Internet. Users require Internet searches to be performed quickly, and the information for which the user is searching to be efficiently provided to them. The present invention provides a method for searching the Internet which significantly reduces the time required to access data, organisations, information and the like of interest to a user.

By providing images in a web-page search results list some subliminal, eye-catching, enticing, aesthetic or the like information can be provided to a user. This is an effective advertising/marketing means.

In accordance with the present invention a user commences a web-page search in a conventional manner as indicated hereinbefore, however, instead of receiving a list of web-pages as hyperlinked URL locations only, the user receives the web-page search results list as a page of numerous options having visual content, that is, as a list of entries. The visual content of each entry of the search results list can include images, video, rotation of still images, animation and the like, or even sound information.

In further embodiment, the present invention provides that sounds associated with each entry in the search results list can be provided to a user when the computer mouse is positioned within a region of the computer screen, for example within the borders of an entry.

The visual content produced will allow identification of the web-page or organisation with which the visual content is associated to be more readily ascertained by the user. This should provide users with an indication of the content of the web-page or the organisation to which the web-page pertains, without requiring the user to actually hyperlink to the actual web-page identified in the search results list.

Hence, the user should also be able to quickly scan the results list for any redundancy in web-pages or web-sites.

The present invention includes a database to store information from the Internet. Information stored in a database can include, amongst other features: web-page URL addresses; e-mail addresses; organisation logo/trade mark images; a 'mini-image' of the homepage or any other web-page of web-sites; and navigation key to a phone directory. In response to a user's search request, the database is interrogated by appropriate database searching software to identify relevant database entries which can then be transmitted to a terminal as a search results list.

When a search is completed on behalf of a user each entry in the search results list can be provided with navigation keys to access the options of homepage/email address/logos/ phone directory/etc. An entry in the search results list may also be provided with animation of a logo, video or sound if desired.

It should be noted that the invention can also provide that the database may be accessed by an operator who, after receiving a request from a user via telephone, facsimile, e-mail or the like, then accesses the database and provides the user with the information which they require. Said information may include telephone numbers, e-mail addresses, physical addresses or the like. The operator may provide the information in any format, for example verbally or as text.

Illustrated in FIG. 1 is an example of the prior art illustrating how search results are presently presented to a user. Each entry 1 of the search results list provides a hyperlink 2 to a web-page of a web-site. Limited information is presented to the user and the user is often unaware whether or not repetition of web-sites or web-pages has occurred in the search results list. The user must mouse-click on the hyperlink 2 to request the web-page to be displayed on the user's Internet browser.

Illustrated in FIG. 2 is a preferred embodiment of the present invention detailing how, after a user has performed a search request, the search results list 3 is presented with visual content. Each entry 4 of the search results list 3 provides textual information and at least one hyperlink 5. Additionally, each entry 4 of the search results list 3 provides a 'mini-image' of the homepage 6 and/or the organisation's, or another organisation's, logo or trade mark 7.

It should be noted that the images presented in FIG. 2 do not represent a realistic search and images have been provided by way of example only. The logo or trade mark 7 need not, but may, be associated with the mini-image 6. The logo or trade mark 7 can be provided as advertising for a sponsor, or can be a logo or trade mark 7 of the organisation which owns the mini-image 6.

By providing the mini-image 6 as part of the search results list 3 a user is able to more readily ascertain to what organisation the associated hyperlink 5 relates. Furthermore, the mini-image itself may be a hyperlink to a web-page.

Preferably, having visual content provided in the search results list requires registration with the database administrator by an organisation. Organisations not being registered may still be identified in the search results list in the conventional manner, but visual content may not be provided in unregistered organisation's entries.

Figure 3:
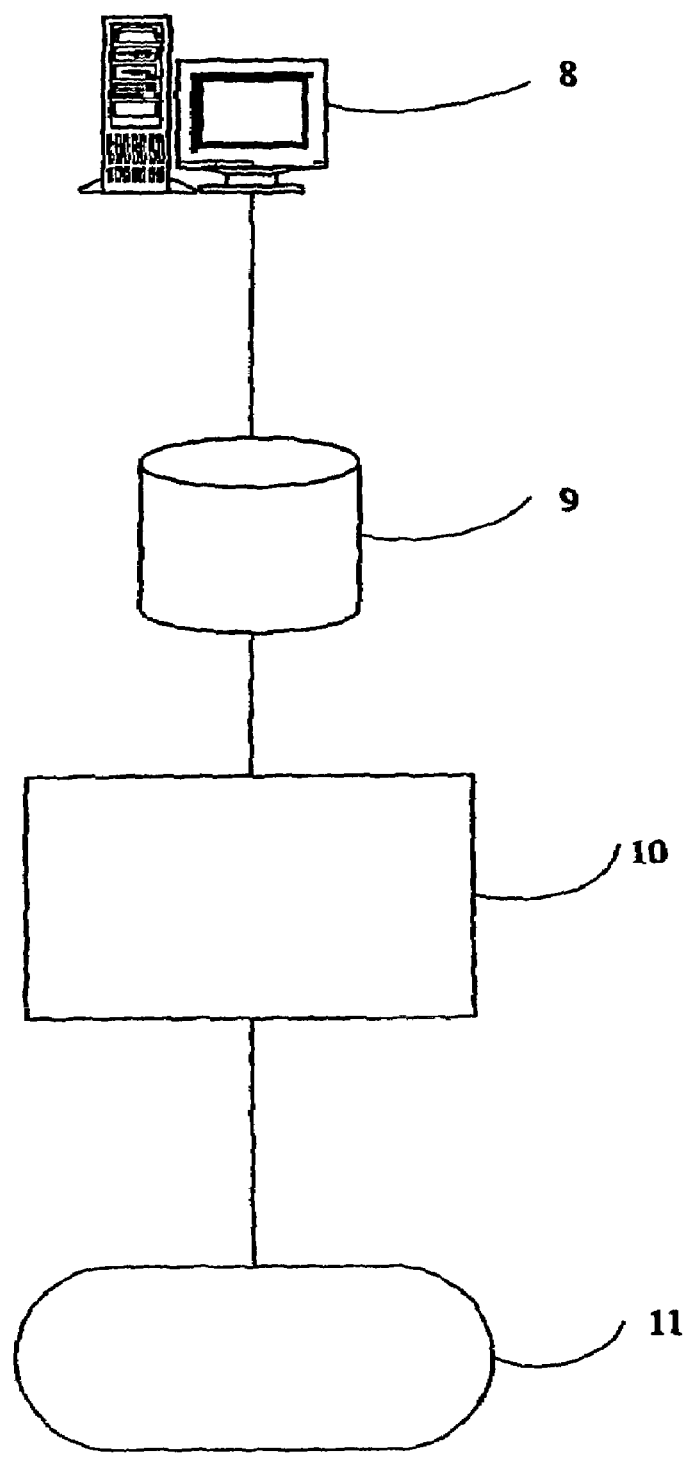
FIG. 3 illustrates an embodiment of the present invention wherein, the figure shows a general flowchart of a system to implement the present invention.

Illustrated in FIG. 3 is the general structure of the searching hierarchy. A server 8 is provided to interface with the Internet and receive search requests from users and provide search results. The server 8 contains the database 9 which stores information regarding each entry 4 which may be provided in a search results list 3. The server-side application 10 provides functionality to search and retrieve entries from the database 9. The server-side application 10 takes a search request from a user, searches the database 9 to identify database entries and form a search results list, and passes the search results list back to the user via the user's Internet browser. The output module 11 will output the search results list 3 to a user's Internet browser.

Specifics of a preferred, but non-limiting, embodiment of the present invention are now provided. The server 8 is a Cobalt server. The server can be attached to the Internet via a 100 MB backbone. The operating system is Linux. The web server is Apache which easily integrates with Linux. The preferred database 9 is SQL and more specifically MySQL or other comparative competent equipment available the market to the inventor. The server-side application 10 is programmed using PHP. The output module 11 will use PHP to output the search results to an Internet browser. HTML, DHTML, Cascading style sheets and/or Javascript applications on the search engine web-site will assist in this respect. A spider application will be used to build the database 9 content.

By providing the search results list with visual content various entries of the search results list may attract impulse viewers to a web-page even if the user was searching a general directory for something other than subject matter of the web-page. An eye-catching web-page image or recognisable logo or trade mark may prompt the user to visit a web-page which may not have been the user's original intention.

In a preferred embodiment the search results list may provide textual information only for organisation's which are not registered with the search engine company offering a search results list having visual content. Hence, the unregistered organisation will appear side-by-side with other organisations having associated images which will put the unregistered organisation at a distinct disadvantage, thereby prompting the unregistered organisation to register with the search engine company.

The database can be constructed to have an entry for all organisation's which can be located by the database operator. A user can the have access to all such directory information. However, only subscriber organisations which pay a fee would be allocated visual content or sound information associated with their database entry. These varying degrees of exposure should entice organisations to become a subscriber so better market the organisation to users.

In a further preferred form of the present invention the database may be made available as a visual content searchable directory on storage means, for example CD ROM or DVD.

It can also be provided that e-mail, telephone, physical address or other information is stored in the database 9 and accessed by a user if required.

In a further preferred embodiment, visual images can be provided by streaming video technology through video-camera or direct video streaming. Furthermore, visual banner advertising can be provided using video streaming in conjunction with the present invention. In a further embodiment of the present invention, the invention may be provided by utilising broadband technology, cable television, web-TV and/or Dynamic Digital Depth (DDD) technology or the like.

In still a further preferred embodiment of the present invention, any hyperlink whether visual or not, may point to a category of services/products, for example shopping, employment, travel, accommodation etc. A hyperlink or entry in the database can act as a 'portal' to a category.

In a further embodiment of the present invention, the mini-image may be provided as a 'conveyor belt slide show'. The 'conveyor belt slide show' can be implemented using Javascript conveyor belt slide show script.

Hence, code may be provided which is associated with an entry so that, for example, when a user's mouse pointer moves over the mini-image further images are presented. The further images may extend in a vertical or horizontal fashion, or indeed be presented in any other format.

Each slide of the slide show can show further advertising, organisation logos, trade marks, etc. Furthermore, a mini-image or slide of a slide show may be provided with voice over options. These options can provide audio functionality to the entry. The audio may be launched automatically or by some prompt, for example activation by a user or by the user's mouse pointer entering a certain region.

Similarly, animation and/or streaming video can be provided. It should also be noted that more than one mini-image may be provided per entry if desired. The 'conveyor belt slide show', voice overs, other audio, animation, streaming video or the like, can be provided as an option which may be activated or stopped by the user depending upon the user's preference.

Still further, a entry may contain an applet which may launch automatically or after activation by a user. The applet is an executable program which executes on the user's terminal and may perform a range of functions.

Figure 4:
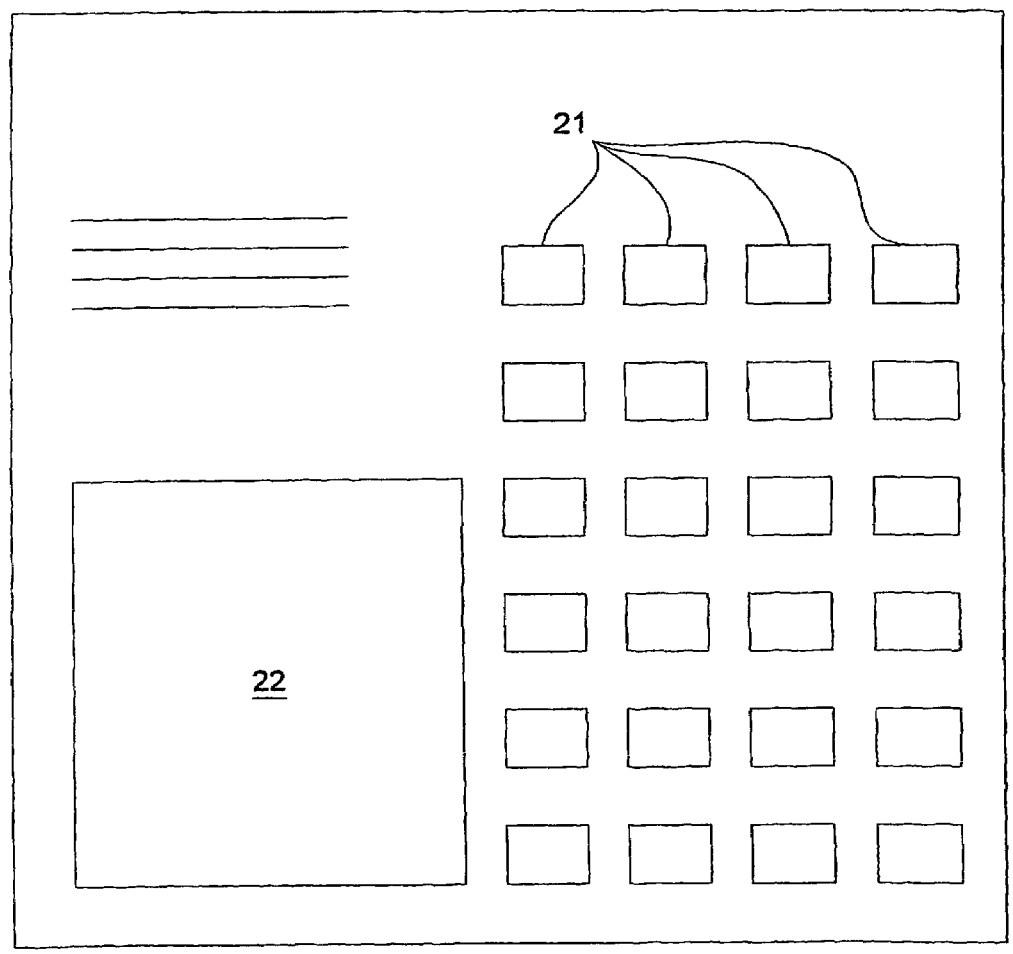
FIG. 4 illustrates an embodiment of the present invention wherein, the figure shows how mini-images may be grouped in a window or panel on a computer screen.

Illustrated in FIG. 4 is a window 20 of a computer screen. The window 20 is presented to a user and contains pictures or images as mini-images 21 from a web-site. Each mini-image 21 is presented in the window 20 as an organised grouping or hierarchy of pictures or images. The pictures or images can be grouped by user-defined categories, such as, for example, news, cars, finance, etc. The pictures or images can also be grouped dynamically as a user obtains search results or visits web-pages. Dynamic grouping may be time-based, such as daily, weekly, etc. groupings. This allows users to be able to review were they have visited, or what they have identified in the past by simple reference to the pictures or images.

It is presently known to group hyperlinks in 'Favorites' or 'History' groupings in web browsers; however, it is only known to group such hyperlinks as text. The grouping of pictures or images derived from identified web-pages is not presently known. In one form, the present invention shows hyperlinks as pictures or images, thereby allowing a user to more readily remember the web-page or identify the proprietor of the web-site. Saving mini-images on the user's computer may be effected by the user themselves or automatically. The specific format for the display of mini-images may naturally be significantly varied from that displayed in FIG. 4.

The window 20 displayed on the users computer screen can be associated with any number of application programs, for example, a web browser or file explorer, or if desired, displayed as a stand-alone window.

When the mouse pointer on the screen is passed over or clicks on an image 21, the image 21 can be enlarged and displayed in the box 22. This provides the user with a clearer and more defined image. The format of the images may naturally be selected from any number of picture or image formats. Hence, the user is provided with an image based categorised local directory of hyperlinks should the user wish to link to an actual web-page.

According to a further embodiment of the present invention, the invention can incorporate audio provided to the user. Software can be utilised to provide information concerning search results, directions to users, favourites lists, or any other aspects of the invention, to a user in audio format. In a particular embodiment, software is provided which can incorporate Text-To-Speech (TTS) technology. This allows a user to hear audio from a computer's speakers based on information in or identified by a user's computer. For example, by locating a computer mouse in a defined area, or clicking a computer mouse on a defined object on a terminal screen or in a defined area, audio can be triggered to generate via a terminal's speakers. As a further example, as a user moves their mouse pointer over mini-images in a favourites list, distinct audio sounds associated with each mini-image could be played.

As one embodiment of the present invention provides an online web-page search engine, so too can an embodiment of the present invention provide an online directory, for example an online business directory. In a specific embodiment, the online business directory can be a compilation of all businesses, which may or may not be geographically limited. The online business directory can be accessed by a user via an Internet browser. It is envisaged that the business directory includes all businesses known to the directory administrator and that contact information, such as telephone numbers, facsimile numbers, e-mail addresses, for each of the listed business's is available to the user. The user can search the directory by any conventional means, for example keyword searching or progressively limiting categories by selection of options with a mouse. However, the directory also provides that at least some of the entries are provided with visual content or audio information. A business can become a subscriber and pay a fee to have visual content or audio information associated with that business's entry in the directory. This provides an advertising or marketing edge to a subscriber business over a non-subscriber business, as the user is more likely to take note of the directory entry having associated visual content.

In a further specific embodiment, the online business directory can be provided with the appearance of a print telephone or business directory, and when the user moves a mouse pointer over the location of an entry, additional information, such as visual content, appears in a reserved window or location, if the entry is a subscriber.

It should be noted that the computer network as referenced in this specification should be taken to include all forms of connected or communicating computers or terminals having at least two terminals connected or communicating as hereinbefore described.

That is, the term computer network should be taken to include any type of terminal as hereinbefore defined, computer, computerised device, peripheral computer equipment, computerised accessory, mobile or cellular phone, digital electronic device or other similar type of computerised electronic device or part thereof which is rendered such that it is capable of communicating with at least one of any of the aforementioned entities. Said communication of information or data can occur over any data communications network, computer network, wireless network, internetwork, intranetwork, local area network (LAN), wide area network (WAN), the Internet and developments thereof, transient or temporary network, combinations of the above or any other type of network providing for computerised, electronic or digital devices.

Furthermore, references to the terms connecting, communicating, transmitting, requesting, receiving, exchanging and the like, and permutations thereof, as applied to the term computer network and/or components thereof should be taken to pertain to the transfer of information or data.

Such transfers of information or data can be facilitated for by any form of entity/entities for facilitating such, including, but not limited to, metallic wires or cables, semi-conducting wires or cables, optical fibres and optical devices, wireless means, electromagnetic waves and the like and modulations thereof, acoustic waves and the like and modulations thereof, control of electric and/or magnetic fields, and/or the transportation of all forms of memory devices.

Thus, there has been provided in accordance with the present invention, an improved method of locating web-pages by utilising visual images; an improved method of placing a user in contact with an organisation; and/or a computer readable medium of instructions for providing a user a with an improved method of locating web-pages by utilising visual images, or placing a user in contact with an organisation.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made herein by one of ordinary skill in the art without departing from the spirit or scope of the present invention as hereinbefore described and as hereinafter claimed.

The invention claimed is:

1. A method for locating a web-page using a distributed computing system comprising the steps of:
   receiving a search request from an associated user;
   searching a database containing selected data representative of information associated with web pages, wherein such data is in the form of data entries, wherein each entry is associated with at least one web page;
   identifying selected entries contained in the database in accordance with the search request;
   generating a search results list comprised of the selected entries, wherein each entry includes at least one of a hyperlink for the associated web page and visual content associated with such web page; and
   displaying the search results, wherein the user is able to view the visual content associated with each entry without activating the hyperlink for the web page;
   wherein the visual content includes at least one of a hyperlink, image, video, animation, mini-image of a web page, streaming video, logo of an organization associated with the web page, and trademark of an organization associated with the web page; and
   wherein the visual content comprises a plurality of mini-images in the form of a conveyor belt slide show.

2. The method according to claim 1 wherein at least one entry contained in the search results lists includes textual information in addition to visual content.

3. The method according to claim 1 further comprising the step of submitting the search request by the associated user in a keyword format, wherein the database is searched using such keyword format.

4. The method according to claim 3 wherein the keywords which are submitted and searched relate to an organization's name, part of an organizations name, trade names, and trademarks.

5. The method according to claim 1 wherein at least one entry contained in the search results list includes information for an organization associated with the web page including at least one of the organization's telephone number, the organization's electronic mail address, and the organization's facsimile number.

6. The method according to claim 5 wherein at least one of the organization's telephone number, the organization's electronic mail address, and the organization's facsimile number is in a hyperlink format, wherein the associated user can activate such hyperlink to initiate contact with the organization via the selected mode.

7. The method according to claim 1 wherein the mini-images include at least one of advertising for an organization associated with the web page, a logo of an organization associated with the web page, and a trademark of an organization associated with the web page.

8. The method according to claim 1 wherein at least one entry contained in the search results list includes at least one applet, wherein in the applet is launched at least one of automatically and after receiving activation input from an associated user.

9. The method according to claim 1 wherein at least one entry contained in the search results list includes sound content, wherein such sound content is activated after receiving activation input from an associated user.

10. The method according to claim 1 wherein the search results are displayed via an Internet browser application.

11. The method according to claim 1 further comprising the step of storing the visual content associated with at least one entry in at least one of a organized hierarchy and organized groups for access by an associated user.

12. A system for locating a web-page using a distributed computing system comprising:
   means adapted for receiving a search request from an associated user;
   means adapted for searching a database containing selected data representative of information associated with web pages, wherein such data is in the form of data entries, wherein each entry is associated with at least one web page;
   means adapted for identifying selected entries contained in the database in accordance with the search request;
   means adapted for generating a search results list comprised of the selected entries, wherein each entry includes at least one of a hyperlink for the associated web page and visual content associated with such web page; and
   means adapted for displaying the search results, wherein the user is able to view the visual content associated with each entry without activating the hyperlink for the web page;
   wherein the visual content includes at least one of a hyperlink, an image, a video, animation, a mini-image of a web page, streaming video, a logo of an organization associated with the web page, and a trademark of an organization associated with the web page; and
   wherein the visual content comprises a plurality of mini-images in the form of a conveyor belt slide show.

13. The system according to claim 12 wherein at one least entry contained in the search results lists includes textual information in addition to visual content.

14. The system according to claim 12 further comprising means adapted for submitting the search request in a keyword format and means adapted for searching the database using such keyword format.

15. The system according to claim 14 wherein the keywords which are submitted and searched relate to an organization's name, part of an organizations name, trade names, and trademarks.

16. The system according to claim 12 wherein at least one entry contained in the search results list includes information for an organization associated with the web page including at least one of the organization's telephone number, the organization's electronic mail address, and the organization's facsimile number.

17. The system according to claim 16 wherein at least one of the organization's telephone number, the organization's electronic mail address, and the organization's facsimile number is in a hyperlink format, wherein the associated user can activate such hyperlink to initiate contact with the organization via the selected mode.

18. The system according to claim 12 wherein the mini-images include at least one of advertising for an organization associated with the web page, a logo of an organization associated with the web page, and a trademark of an organization associated with the web page.

19. The system according to claim 12 wherein at least one entry contained in the search results list includes at least one applet, wherein in the applet is launched at least one of automatically and after receiving activation input from an associated user.

20. The system according to claim 12 wherein at least one entry contained in the search results list includes sound content, wherein such sound content is activated after receiving activation input from an associated user.

21. The system according to claim 12 wherein the search results are displayed via an Internet browser application.

22. The system according to claim 12 further comprising means adapted for storing the visual content associated with at least one entry in at least one of a organized hierarchy and organized groups for access by an associated user.

23. A computer-implemented method for assisting a user to be placed in contact with an organization comprising the steps of:
   receiving a search request from an associated user;
   searching a database containing selected data representative of information associated with web pages, wherein such data is in the form of data entries, wherein each entry is associated with at least one web page;
   identifying selected entries contained in the database in accordance with the search request;
   generating a search results list comprised of the selected entries, wherein each entry includes at least one of a hyperlink for the associated web page and visual content associated with such web page; and
   displaying the search results list wherein the user is able to view the visual content associated with each entry without activating the hyperlink for the web page;
   wherein the visual content includes at least one of a hyperlink, an image, a video, animation, a mini-image of a web page, streaming video, a logo of an organization associated with the web page, and a trademark of an organization associated with the web page; and
   wherein the visual content comprises a plurality of mini-images in the form of a conveyor belt slide show.

24. The method according to claim 23 wherein only entries associated with an organization which has subscribed to a selected database service include visual content associated with the web page associated with such organization.

25. A system for assisting a user to be placed in contact with an organization comprising:
   means adapted for receiving a search request from an associated user;
   means adapted for searching a database containing selected data representative of information associated with web pages, wherein such data is in the form of data entries, wherein each entry is associated with at least one web page;
   means adapted for identifying selected entries contained in the database in accordance with the search request;
   means adapted for generating a search results list comprised of the selected entries, wherein each entry includes at least one of a hyperlink for the associated web page and visual content associated with such web page; and
   means adapted for displaying the search results list wherein the user is able to view the visual content associated with each entry without activating the hyperlink for the web page;
   wherein the visual content includes at least one of a hyperlink, an image, a video, animation, a mini-image of a web page, streaming video, a logo of an organization associated with the web page, and a trademark of an organization associated with the web page; and
   wherein the visual content comprises a plurality of mini-images in the form of a conveyor belt slide show.

26. The system according to claim 25 wherein only entries associated with an organization which has subscribed to a selected database service include visual content associated with the web page associated with such organization.

27. A computer-implemented method for locating a web-page using a distributed computing system comprising the steps of:
   receiving a search request from an associated user;
   searching a database containing selected data representative of information associated with web pages, wherein such data is in the form of data entries, wherein each entry is associated with at least one web page;
   identifying selected entries contained in the database in accordance with the search request;
   generating a search results list comprised of the selected entries, wherein each entry includes at least one of a hyperlink for the associated web page and visual content associated with such web page; and
   displaying the search results, wherein the user is able to view the visual content associated with each entry without activating the hyperlink for the web page;
   wherein the visual content includes at least one of a hyperlink, an image, a video, animation, a mini-image of a web page, streaming video, a logo of an organization associated with the web page, and a trademark of an organization associated with the web page; and
   wherein the visual content comprises a plurality of mini-images in the form of a conveyor belt slide show.

28. A computer-readable medium of instructions for locating a web-page using a distributed computing system comprising:
   means adapted for receiving a search request from an associated user;
   means adapted for searching a database containing selected data representative of information associated with web pages, wherein such data is in the form of data entries, wherein each entry is associated with at least one web page;
   means adapted for identifying selected entries contained in the database in accordance with the search request;
   means adapted for generating a search results list comprised of the selected entries, wherein each entry includes at least one of a hyperlink to for the associated web page and visual content associated with such web page; and
   means adapted for displaying the search results, wherein the user is able to view the visual content associated with each entry without activating the hyperlink for the web pager;
   wherein the visual content includes at least one of a hyperlink, an image, a video, animation, a mini-image of a web page, streaming video, a logo of an organization associated with the web page, and a trademark of an organization associated with the web page; and
   wherein the visual content comprises a plurality of mini-images in the form of a conveyor belt slide show.

29. A computer-implemented method for assisting a user to be placed in contact with an organization comprising the steps of:
   receiving a search request from an associated user;
   searching a database containing selected data representative of information associated with web pages, wherein such data is in the form of data entries, wherein each entry is associated with at least one web page;
   identifying selected entries contained in the database in accordance with the search request;
   generating a search results list comprised of the selected entries, wherein each entry includes at least one of a hyperlink to for the associated web page and visual content associated with such web page; and displaying the search results list wherein the user is able to view the visual content associated with each entry without activating the hyperlink for the web page;

wherein the visual content includes at least one of a hyperlink, an image, a video, animation, a mini-image of a web page, streaming video, a logo of an organization associated with the web page, and a trademark of an organization associated with the web page; and wherein the visual content comprises a plurality of mini-images in the form of a conveyor belt slide show.

30. A computer-readable medium of instructions for assisting a user to be placed in contact with an organization comprising:

means adapted for receiving a search request from an associated user;

means adapted for searching a database containing selected data representative of information associated with web pages, wherein such data is in the form of data entries, wherein each entry is associated with at least one web page;

means adapted for identifying selected entries contained in the database in accordance with the search request;

means adapted for generating a search results list comprised of the selected entries, wherein each entry includes at least one of a hyperlink to for the associated web page and visual content associated with such web page; and means adapted for displaying the search results list wherein the user is able to view the visual content associated with each entry without activating the hyperlink for the web page;

wherein the visual content includes at least one of a hyperlink, an image, a video, animation, a mini-image of a web page, streaming video, a logo of an organization associated with the web page, and a trademark of an organization associated with the web page; and wherein the visual content comprises a plurality of mini-images in the form of a conveyor belt slide show.

* * * * *